Patented May 5, 1931

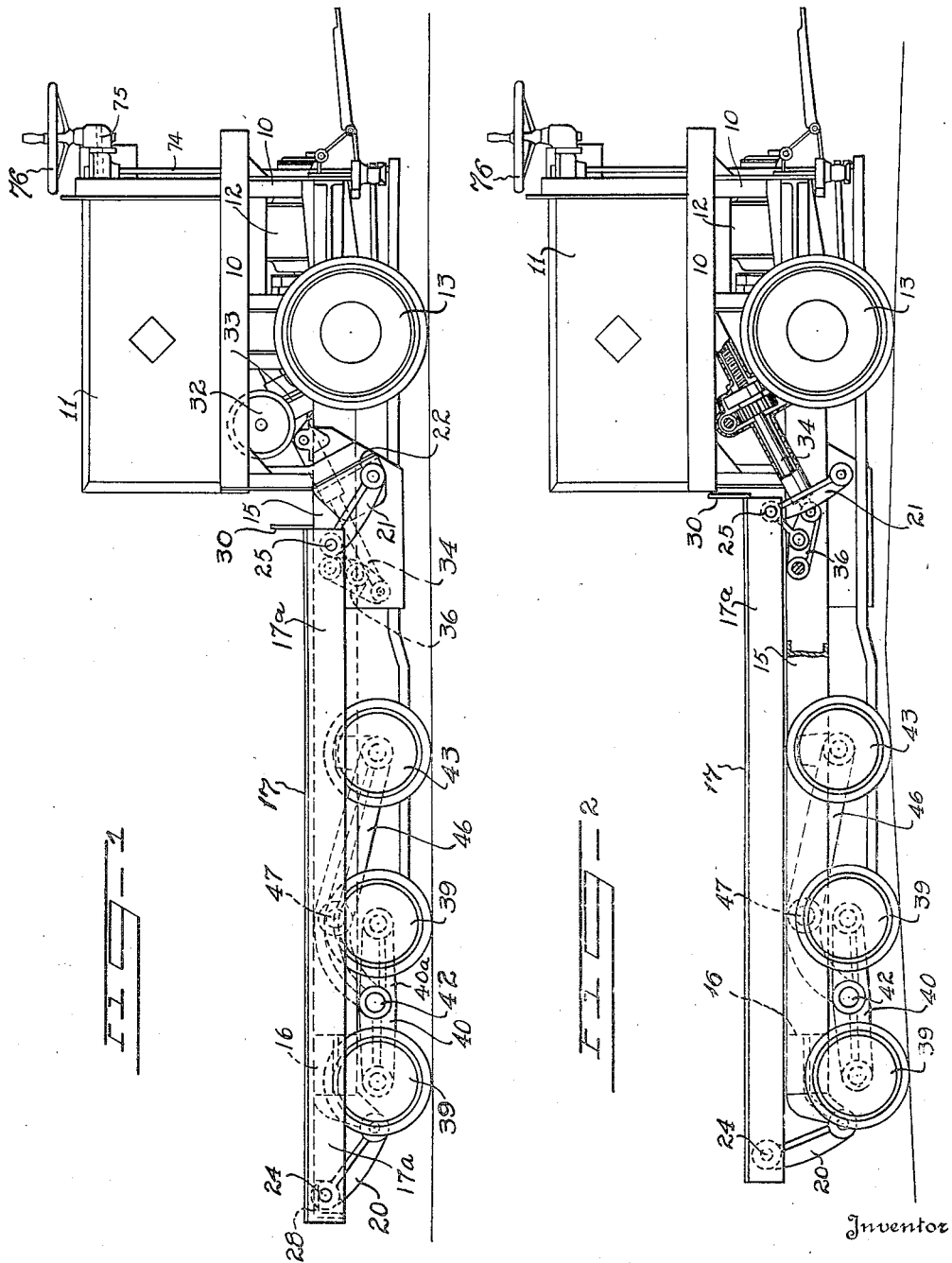

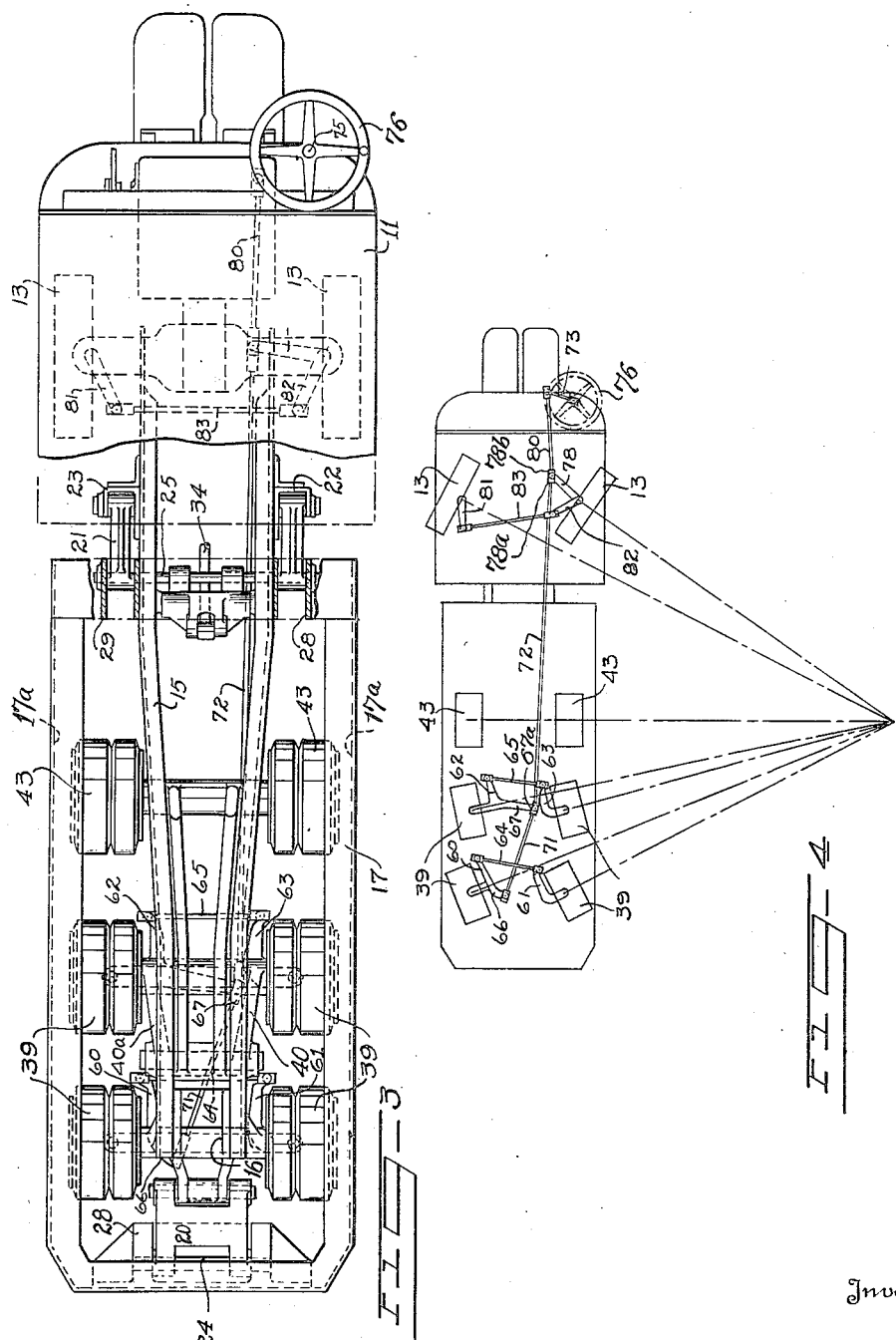

1,804,046

UNITED STATES PATENT OFFICE

EDWARD J. ABBE, OF CLEVELAND, OHIO, ASSIGNOR TO THE ELWELL PARKER ELECTRIC COMPANY, OF CLEVELAND, OHIO, A CORPORATION OF OHIO

INDUSTRIAL TRUCK

Application filed February 10, 1928. Serial No. 253,318.

This invention is concerned with industrial trucks, and has for its general subject, the provision of an arrangement of a main frame and sub-frame, mechanisms to be co-operatively adaptable for use in industrial trucks of the elevating platform type, to permit a plurality of pairs of wheels to follow pavement or traction surface irregularities, whereby extraordinarily heavy loads may be transported while deposited upon the platform, the nature of the invention being such that the weight of the load will be distributed uniformly to a plurality of relatively small wheels disposed beneath the platform in such manner as to prevent any substantial angular lateral displacement of the main frame relative to the sub-frame connections to the main frame irrespective of how the load is distributed upon the platform.

A further object of my invention is the provision of a compact arrangement of dirigible and non-dirigible, relatively small wheels beneath the low slung portion of the main frame of an industrial truck of the elevating platform type whereby this entire mechanism may be compactly arranged to have a minimum vertical clearance above the traction surface, thus affording ready insertion or placement of the platform beneath a skid having distributed thereon an extraordinarily heavy load whereby the weight of such skid and load will be distributed to a plurality of pairs of wheels spaced longitudinally of the platform and skid.

Other objects of my invention will hereinafter become apparent from the following description, which refers to the accompanying drawings illustrating a preferred embodiment thereof. The essential characteristics of the invention are summarized in the claims.

In the drawings Fig. 1 illustrates an industrial truck of the elevating platform type having a portion of the frame disposed at as low a level as is possible relative to the power end of the truck, whereby the platform may be inserted beneath the skid upon which the load to be handled is disposed and, in the present instance, my invention is embodied in an elevating platform truck of the type referred to wherein the platform has only a limited vertical or load elevating movement; Fig. 2 is a side elevational view similar to Fig. 1, but showing part of the platform actuating means in cross section and showing the relative displacement of the wheels of the truck when passing over an uneven traction surface or when engaging a loaded skid when on such a surface; Fig. 3 is a plan view of the truck with part of the load elevating platform omitted; Fig. 4 is a diagrammatical representation of the steering and running gear of the truck.

In my prior application, Serial No. 70,744, filed November 23, 1925, I disclosed a so-called industrial truck provided with two pairs of dirigible wheels compactly disposed beneath a low slung portion of the truck frame and the load elevating platform whereby a load considerably in excess of the usual standard load of three or five tons could be rapidly handled by the truck without any unusual depreciation of the truck frame and running gear. My present invention contemplates a further distribution of the load to an extra pair of wheels, whereby a truck construction of the load elevating platform type may be utilizable for raising, lowering and transporting individual loads in excess of fifteen tons. The particular form of truck shown in the drawings will be capable of repeatedly handling fifteen ton loads due to the fact that I distribute such relatively enormous weight to six pairs of double tired wheels in a uniform manner while preventing any excess strain and resulting warping of the chassis frame and I thus also prevent destruction of the traction surface or pavement upon which the truck travels by reason of the distribution of such a heavy load over a greater traction surface area.

In the drawings, I show an arrangement of sub-frame members which are pivotally connected to the main frame of chassis of the truck whereby a beam action is afforded within the necessarily limited available space for under gear of such trucks and this beam action is such as to distribute to six double wheels the entire platform load which is transmitted thereto through a single horizontally arranged pivotal connection between the main frame and the under gear.

In Fig. 1, I show an industrial truck in side elevation embodying the features of my invention. In general, the truck comprises a chassis or main frame having at one end an upright housing indicated at 10 which may support a battery 11, or other source of power. In the present instance, the truck is illustrated as being equipped with a battery for energizing a motor 12 disposed within the lower part of the housing portion of the main frame, which motor is arranged to drive a pair of steerable or dirigible traction wheels 13 through suitable reduction gearing disposed within the housing and beneath the battery 11. Extending forwardly from the housing portion of the frame, is a low slung portion of the main frame comprising chassis bar members 15 connected at the outer or forward end thereof by a frame bracket 16. The chassis bars 15 converge slightly as they extend outwardly from the housing portion 10 of the frame and disposed immediately above the low slung portion of the main frame, is a load elevating platform 17 disposed at a sufficiently low level to be inserted beneath a skid carrying a load to be transported. The platform may be mounted to traverse an upright frame if desired for tiering a load, or, as shown in the present instance, may be connected to the main frame by links 20 at the outer forward end of the frame which links are pivotally connected to the end brackets 16 of the chassis frame. A similar pair of links 21 serve to connect the inner end of the platform to the chassis frame through bracket members 22 and 23 attached to the side of the chassis bars 15. The links 20 and 21 may be pivotally attached in any suitable manner, such as pins 24 and 25 respectively, to bracket members 28 and 29 attached to the underside of the platform 17.

The platform 17 is provided with a downwardly extending flange portion 17a entirely around the outer marginal edges thereof which greatly increases its rigidity and the inner end thereof may be strengthened in any suitable manner such as by a heavy angular iron 30.

The platform may be operated to raise a load by a motor 32 acting through suitable reduction gearing 33 to operate a bar 34 which is connected to and operates a lever or toggle mechanism 36, the latter arrangement being described and claimed in my copending application, Serial No. 245,979, filed Jan. 11, 1928.

Inasmuch as it is proposed to utilize the truck herein disclosed for the handling of loads of fifteen ton weight or more, it becomes necessary to distribute such a relatively enormous weight to a plurality of pairs of small wheels, the live load bearing factors of which are limited to the crushing strength of tires of such small diameter, and I recommend the use of six pairs of wheels as shown, and I provide a sub frame 40 which may be unitary in construction, such as a steel casting, and to which two of the pairs of wheels 39 are pivotally attached on vertically extending spindles, whereby they may be steerable or dirigible. I distribute the remainder of the load to an extra pair of wheels 43 which, in the present instance, may be non-dirigible. The extra pair of wheels may be mounted upon the inner end of a second sub frame 46, the outer end of this sub frame being pivotally attached to the sub frame 40 at a position intermediate the normal axis of the two pairs of dirigible wheels 39 and I pivotally attach the sub frame 46 to the chassis bars 15 along a horizontal axis at a point indicated at 47 whereby the sub frame 46 becomes a beam or lever which will transmit the entire load deposited on the platform 17 substantially uniformly to the wheels 39 and wheels 43 when the truck is operated over an uneven or irregular traction surface as shown in Figs. 1 and 2. The relative distances between the pivotal connections 42 and 47 and the axis of the wheels 43 may be in proper ratio to form the desired beam reaction whereby the load will thus be substantially uniformly distributed to the six wheels beneath the platform and the low slung portion of the chassis frame.

It will be seen that this arrangement of pivotal connection of the six wheels to the chassis frame will prevent any one pair of wheels from becoming raised from the traction surface in the event an irregularity is encountered which would tend to bring such a raising of one of the pairs of wheels about, and I find that by utilizing a twin tire arrangement for each wheel the factor of safety of the tires of such small diameter will not be exceeded in repeatedly transmitting a load of fifteen tons, and furthermore, the arrangement is such that I may dispose all three pair of wheels longitudinally of the platform and between the platform flanges and side bars of the chassis frame with their normal axes spaced to include the major portion of the traction surface beneath the platform, while leaving sufficient space for the steering gear.

As shown in Fig. 3, the chassis side bars of the chassis frame converge toward each other at the rear end of the truck beneath the platform whereby the upper portions of the small wheels 39 and 43 may be disposed between the side flanges 17a of the elevating platform and the chassis frame, thus affording an extremely low drop of the elevating platform. The sub-frame 40 upon which the four small wheels 39 are mounted may comprise an integrally formed structure with forked or bifurcated branches 40a to which may be attached wheel axles or spindles and mounted on these spindles are steering arms 60 and 61 for one pair of wheels 39, and arms 62 and 63 for the other pair of wheels 39. These arms are connected in respective pairs by transverse rods 64 and 65. The arm 62 has extending rearwardly therefrom a similar arm 67 and the arm 60 has extending rearwardly therefrom a similar arm 66. The two latter arms are joined by a connecting rod 71 (see Fig. 4). The arm 67 has attached thereto, a ball joint 67a to which is connected a forwardly extending rod 72. To the wheels 13 are attached axles or spindles, and mounted on these spindles are steering arms 81 and 82. These arms are connected by the transverse rod 83. The arm 82 has extending forwardly therefrom a similar arm 78. The arm 78 has attached thereto a ball joint 78a and 78b. Rod 72 terminates at the ball joint 78a and a rod 80 extends forwardly from the ball joint 78b and is suitably connected to an arm 73 mounted adjacent the lower end of a vertically extending steering post 74. The steering post 74 extends upwardly to a horizontally disposed stud shaft 75 (see Figs. 1 and 2) and reduction gearing, not shown, serves to connect the manually operated steering wheel 76 with the horizontal shaft 75 and with the upright shaft 74.

It will be noted that this steering arrangement may be installed beneath the low slung portion of the truck chassis in a compact manner, without interfering with or decreasing an ample turning radius for the power driven wheels 13 and the smaller dirigible wheels 39, and the steering arms are of ample radius to insure sufficient leverage to steer the truck when an extraordinarily heavy load is deposited upon the platform.

It will also be noted that the floating arrangement of the six small wheels beneath the platform is such that they may rock in pairs on normal axes which remain parallel relative to the pivotal connections of the links 20 and 21 which operatively connect the load elevating platform to the truck chassis, thus preventing any unusual warping of the chassis relative to the wheel axes, and any tendency to cause a jamming or binding of the links due to the swerving of the truck frame is avoided when the load elevating platform is being operated to raise a loaded skid during such times as it may occur that the six small wheels are resting on an irregular or uneven traction surface. The entire compact arrangement disclosed is such that the parts may be of substantial construction to meet the engineering requirements in handling such relatively heavy loads, and the overall dimensions of the truck, despite heavy carrying capacity, are confined to standard dimensions whereby the truck may be utilized in a normal industrial trafficing environment that is, the clearance requirements, etc. are within the usual provisions for traffic conditions of industrial plants, warehouses, freight terminals, etc.

I claim:

1. In an industrial power driven truck a main frame having a low portion, a platform surmounting said low portion and connected thereto, a plurality of pairs of relatively small load supporting wheels disposed beneath said platform, the pairs of wheels being spaced longitudinally of said platform to thereby distribute the weight of the load on the platform over the major extent of the traction surface beneath the platform, means for steering some of said wheels beneath the platform about a common turning center, a sub frame structure carrying those of the wheels which are dirigible, mechanism pivotally joined to said low portion of the main frame and the sub frame, and supporting a pair of non dirigible wheels disposed intermediate the small dirigible wheels and the inner end of the platform, the axis line of said last named wheels being the locus of the turning center of the dirigible wheels.

2. In an industrial power driven truck, the combination of a main frame having a low slung portion extending therefrom adjacent the ground or traction surface, power driven wheels disposed within the frame, a platform connected to and supported by the low slung portion of the frame, a sub frame having attached thereto a plurality of pairs of dirigible wheels to be disposed intermediate the main frame and the outer marginal edges of the platform, a pair of non-dirigible wheels disposed intermediate said small wheels and the power driven wheels, and a second sub frame connecting said non dirigible wheels to the main frame and said first named sub frame to the main frame whereby the load disposed on said platform will be distributed to all of the wheels disposed beneath the low slung portion of the main frame and thus prevent the weight of the load from causing any substantial angular lateral displacement of the main frame relative to the axes of the sub frames when the truck travels over uneven traction surfaces irrespective of the position of the load upon the platform.

3. In an industrial power driven truck, a main frame having a low forwardly extending portion, of a platform over the low portion, a plurality of pairs of load supporting wheels disposed beneath said platform, including dirigible and non-dirigible pairs of wheels, the pairs of wheels being spaced longitudinally of said platform to thereby distribute the weight of the load on the platform over the major extent of traction surface lying beneath the platform, means for steering the dirigible wheels, a sub frame structure, including axle supporting portions spaced longitudinally of the truck, said structure carrying the dirigible wheels, and mechanism pivotally joined to said low portion of the main frame and to the sub frame structure intermediately of said axle supporting portions thereof for supporting all of said wheels, including a pair of non-dirigible wheels, the latter being in longitudinally spaced relation to the said dirigible wheels.

In testimony whereof, I hereunto affix my signature.

EDWARD J. ABBE.